United States Patent
Ta et al.

(10) Patent No.: US 7,443,131 B2
(45) Date of Patent: Oct. 28, 2008

(54) CONTROL DEVICE FOR ELECTRIC POWER STEERING APPARATUS

(75) Inventors: CaoMinh Ta, Gunma (JP); Hideyuki Kobayashi, Gunma (JP); Shuji Endo, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 154 days.

(21) Appl. No.: 10/585,990

(22) PCT Filed: Dec. 12, 2004

(86) PCT No.: PCT/JP2004/019661

§ 371 (c)(1),
(2), (4) Date: Jul. 13, 2006

(87) PCT Pub. No.: WO2005/069475

PCT Pub. Date: Jul. 28, 2005

(65) Prior Publication Data

US 2007/0158132 A1    Jul. 12, 2007

(30) Foreign Application Priority Data

Jan. 13, 2004    (JP)    ............... 2004-005067

(51) Int. Cl.
*H02P 23/00*    (2006.01)
(52) U.S. Cl. ............... 318/807; 318/434; 318/803; 318/813
(58) Field of Classification Search .......... 318/807, 318/434, 453, 254, 138, 803, 500, 720, 603; 388/813, 812
See application file for complete search history.

(56) References Cited

U.S. PATENT DOCUMENTS 5,739,651 A * 4/1998 Miyazawa et al. ..... 318/400.34

FOREIGN PATENT DOCUMENTS

| JP | 3-215182 A | 9/1991 |
|---|---|---|
| JP | 2002-199776 A | 7/2002 |
| JP | 2002-345135 A | 11/2002 |
| JP | 2002-369569 A | 12/2002 |
| JP | 2003-101195 A | 4/2003 |
| JP | 2003-163446 A | 6/2003 |
| JP | 2003-189658 A | 7/2003 |
| JP | 2003-523703 A | 8/2003 |
| JP | 2003-304697 A | 10/2003 |

* cited by examiner

*Primary Examiner*—Karen Masih
(74) *Attorney, Agent, or Firm*—Sughrue Mion, PLLC (57) ABSTRACT

A control device for electric power steering apparatus, in which when torque ripples at the time of the rotation of a motor is reduced by simple arithmetic, smooth and safe assist limitation is performed without deteriorating steering feeling, is provided. For this reason, in the control device for electric power steering apparatus adopting a vector control system for applying an assist force of a motor to a steering system, a phase delay according to an angular velocity is obtained, a corrected electric angle is calculated by adding the phase delay to an electric angle, and generation of a current command value in the vector control is compensated based on the corrected electric angle.

10 Claims, 6 Drawing Sheets

CONTROL DEVICE FOR ELECTRIC POWER STEERING APPARATUS

TECHNICAL FIELD

The present invention relates to a control device for an electric power steering apparatus which adopts a vector control system where a steering assist power is applied to a steering system of an automobile or a vehicle by a motor. The present invention particularly relates to the control device for an electric power steering apparatus in which a delay of a motor current in the vector control system is compensated by an advance angle and thus the performance is improved.

BACKGROUND ART

An electric power steering apparatus, in which a steering apparatus of an automobile or a vehicle is energized by an assist load using rotary force of a motor, driving force of the motor is applied to a steering shaft or a rack shaft via reduction gears or by a transmitting mechanism such as gears or a belt so that the steering shaft or the rack shaft is energized by the assist load. Since such conventional electric power steering apparatus generates an assist torque (steering assist torque) accurately, it controls the feedback of motor currents. The feedback control adjusts a motor applied voltage so that a difference between a current command value and a motor current detected value becomes small or zero. The adjustment of the motor applied voltage is made generally by a duty ratio of PWM (pulse width modulation) control.

Japanese Patent Application Laid-Open No. 2003-189658 A (Patent Document 1) discloses a technique such that a motor present position of an electric power steering apparatus is made to respond at a high speed. A control device in the above Patent Document 1 has a command generator 4 which provides a command θref, a load machine 1 and a motor driving device 2 which drives the load machine 1 based on the torque command Tref. The control device is a delay-compensating motor control device which provides a torque command Tref based on a motor present position θm of the motor driving device 2. This control device is provided with a monitoring device 3 which monitors a state of the motor driving device 2 and provides a motor delay position θn which delays from the motor present position θm, a delay compensating observer 6 which provides an estimated motor present position hθm based on the motor delay position θn and the torque command Tref, and a first control device 5 which provides the torque command Tref based on the command θref and the estimated motor present position hθm.

The electric power steering apparatus in the Patent Document 1 is provided with the delay observer which inputs the delay position θn and the torque command Tref therein and outputs the estimated present position so that the motor present position θm is estimated by the estimated motor present position hθm.

In the device of the Patent Document 1, however, an estimating arithmetic expression is complicated, and it is difficult to determine an inertia moment Jm in an electric power steering. In the electric power steering, a lot of parts such as a motor, reduction gears, an intermediate joint, a rack pinion, tires and so on are subjects for driving. Since respective connecting portions have looseness, it is difficult to obtain the inertia moment Jm.

The present applicant of this invention proposes a delay compensation of a back EMF, but it is supposed that a delay between actual motor information (position, angular velocity, voltage, electric current, back EMF and the like) and an information which is used for the control contributes heavily to occurrence of torque ripples (Japanese Patent Application No. 2003-163446). That is to say, when the delay of the information is compensated, the torque ripples are reduced.

The present invention is devised from the viewpoint of the above circumstances and its object is to provide a control device for an electric power steering apparatus in which torque ripples at the time of rotation of a motor are reduced by a simple arithmetic so that smooth and safe assist control can be made with a steering feeling being improved.

DISCLOSURE OF THE INVENTION

The present invention relates to a control device for an electric power steering apparatus which adopts a vector control system for applying an assist force of a motor to a steering system. The object of the present invention is achieved by that a phase delay according to an angular velocity is obtained, a corrected electric angle is calculated by adding the phase delay to an electric angle, and generation of a current command value in the vector control is compensated based on the corrected electric angle.

Further, the object of the present invention is achieved more effectively by that the phase delay includes a response delay of an electric current control, the phase delay is obtained by a linear function of an offset and a gain, or the corrected electric angle is limited to 0 to 360°.

Furthermore, the object of the present invention is achieved by that a first phase delay according to an angular velocity is obtained, a first corrected electric angle is calculated by adding the first phase delay to an electric angle, generation of a current command value in the vector control is compensated based on the first corrected electric angle, a second phase delay according to the angular velocity is obtained, a second corrected electric angle is calculated by adding the second phase delay to the electric angle, and a back EMF in the vector control is compensated based on the second corrected electric angle.

Still further, the object of the present invention is achieved more effectively by that the first phase delay and the second phase delay include a response delay of electric current control, the first phase delay and the second phase delay are obtained by a linear function of an offset and a gain, or the first corrected electric angle and the second corrected electric angle are limited to 0 to 360°.

BEST MODE FOR CARRYING OUT THE INVENTION

In vector control using a control device for an electric power steering apparatus in which an assist force is applied to a steering system by a motor, it is necessary to generate a current command value which eliminates torque ripples theoretically. In order to eliminate the torque ripples, a delay should not occur in a motor current, but the motor current delays from a current command value due to delay of a sampling cycle and current control. In the present invention, the delay is compensated by advancing an angle to be used when the current command value is generated.

In the present invention, it is understood that an amount of the delay is proportional to a constant delay amount and an angular velocity, and the delay is compensated by a simple primary expression "y=a·x+b". That is to say, the present invention is characterized greatly in that an item whose delay amount is compensated is narrowed down (electric current) and a simple linear function is used so that the effect on an arithmetic amount becomes maximum.

An embodiment of the present invention is explained below with reference to the drawings.

Figure 1:
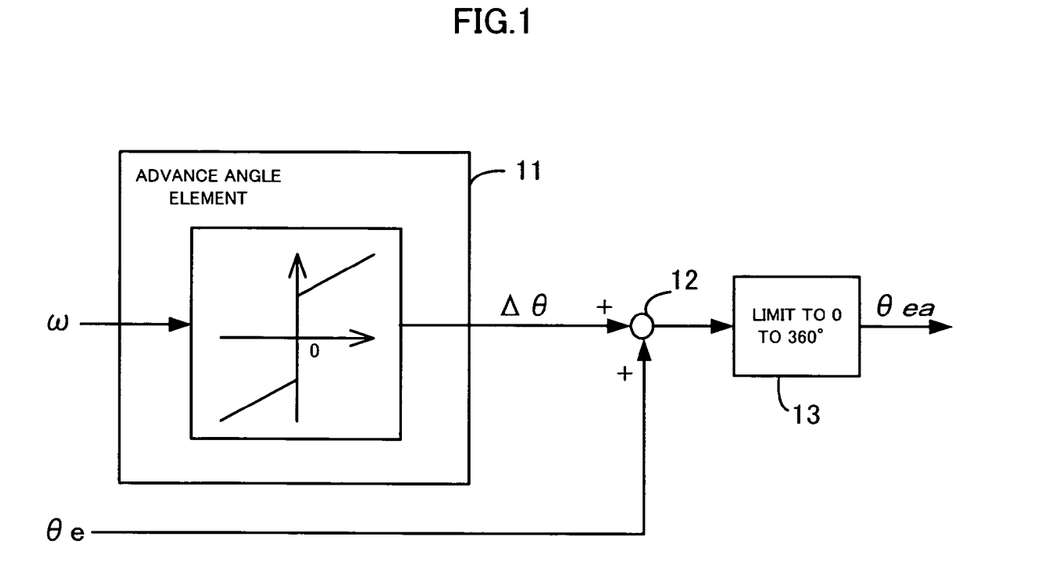
FIG. 1 is a block diagram illustrating the principle of the present invention.

FIG. 1 illustrates the principle constitution of the present invention. An estimated (or detected) motor rotation number (speed) ω is subject to an advance angle control by an advance angle element 11 composing an advance angle control section, an angle estimated value θe is added to the angle Δθ which is subject to the advance angle control by an adding section 12, the angle estimated value is limited to within "0° to 360°" by a limiting section 13, and an angle estimated value θea which is subject to the advance angle control is outputted and the angle estimated value θea is used for a vector arithmetic. The limiting section 13 has a function for limiting the angle estimated value θea within the range of "0° to 360°". That is to say, the angle estimated value θe is limited within the range of "0° to 360°", but when the angle Δθ is added, the angle estimated value θe occasionally exceeds 360°. The exceeded value is returned to the range of "0° to 360°". For example, when the angle estimated value θe is "350" and the angle Δθ is "20", an added value is "370", but the "10" is obtained by "370-360" by the limiting section 13.

Figure 2:
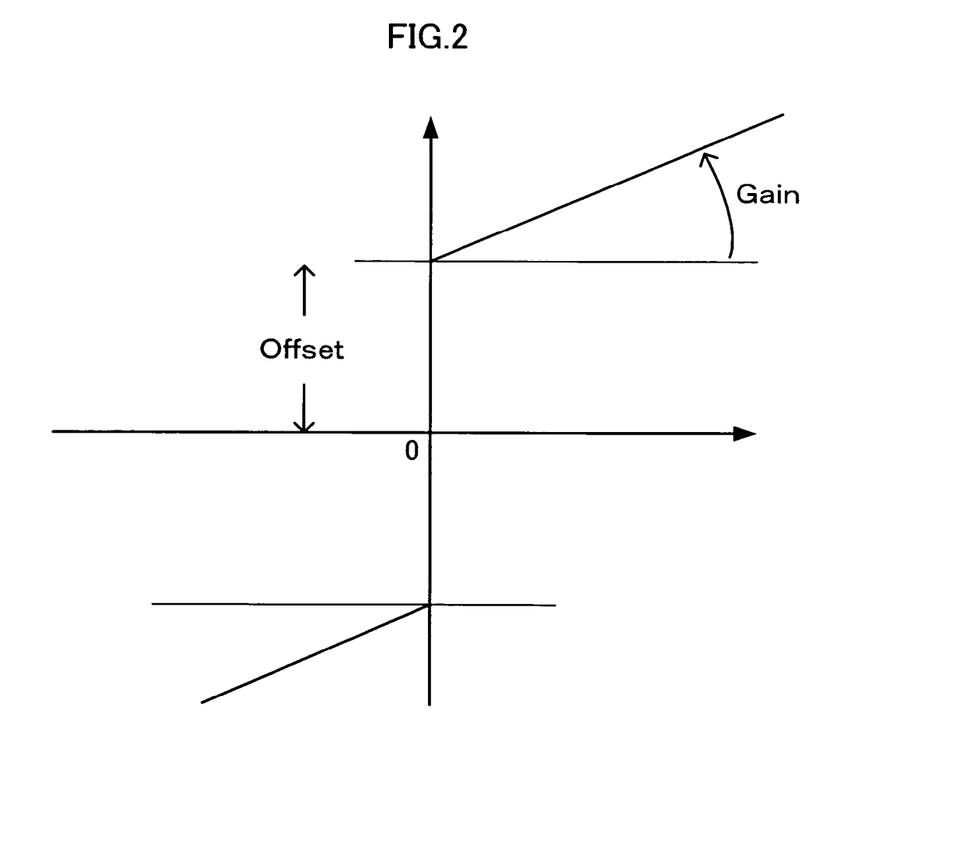
FIG. 2 is a diagram illustrating a feature example of an advance angle control according to the present invention.

As shown in FIG. 2, in the constitution of the advance angle element 11, a linear function, which is obtained by adding (or subtracting) a gain "Gain" to (from) an offset "Offset", is outputted. That is to say, the advance angle element 11 performs an arithmetic of the following expression (1):

$$\Delta\theta = \omega \times \text{Gain} + \text{sign}(\omega) \cdot \text{Offset} \quad (1)$$

When the rotation number ω is subject to the advance angle control so as to be added to the angle estimated value θe and the added result is used when the current command value is generated, the delay amount of the motor current can be compensated, and thus the torque ripples and an operation noise can be reduced.

Figure 3:
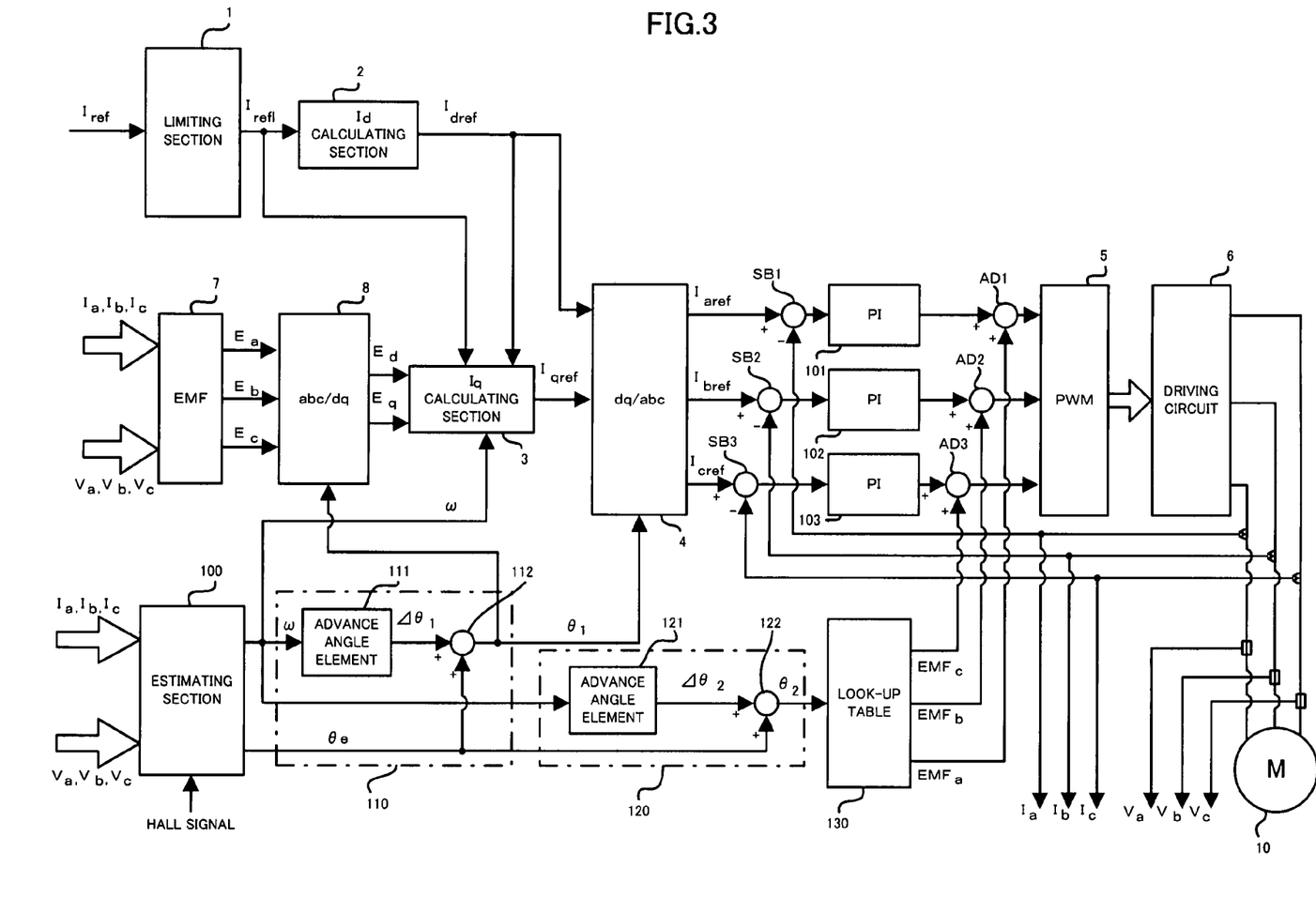
FIG. 3 is a block diagram illustrating a constitutional example of the present invention.

FIG. 3 illustrates an entire constitutional example to which the present invention is applied. A current command Iref is inputted to the limiting section 1, the current command Iref1 whose upper and lower values are limited by the limiting section 1 is inputted to an Id calculating section 2 and an Iq calculating section 3. The Id calculating section 2 calculates a d-axis current in the vector control. The d-axis current is used for controlling a magnetic force of the motor (torque constant), making weakening magnetic field control which weakens an electric field and thus improving the feature of the high-speed rotation. Further, the Iq calculating section 3 calculates a q-axis current in the vector control, and obtains the q-axis current based on a relationship of input/output energy of the motor 10.

The d-axis current Idref from the Id calculating section 2 is inputted to the Iq calculating section 3 and a dq/abc (two-phase/three-phase) converting section 4. The q-axis current Iqref calculated in the Iq calculating section 3 is also inputted to the dq/abc converting section 4, and converted three-phase currents Iaref, Ibref and Icref are outputted from the dq/abc converting section 4. Differences (errors) between the three-phase currents Iaref, Ibref, Icref and the motor currents (Im) Ia, Ib, Ic are obtained by subtracters SB1, SB2 and SB3, respectively. The differences are PI-controlled by PI control sections 101, 102 and 103, respectively, and the PI-controlled voltages are added to back EMFs EMFa, EMFb and EMFc, respectively, by adders AD1, AD2 and AD3 so that the added values are inputted to aPWM circuit 5. The motor 10 is controlled to be driven via a driving circuit 6.

The three-phase motor currents Ia, Ib and Ic are feedbacked to the subtracters SB1, SB2 and SB3, respectively, and are inputted to an EMF (back electromotive voltage) calculating section 7 and an estimating section 100. Three-phase motor voltages Va, Vb and Vc are inputted to the EMF calculating section 7 and the estimating section 100. The three-phase back EMFs Ea, Eb and Ec calculated by the EMF calculating section 7 are inputted to an abc/dq (three-phase/two-phase) converting section 8, and voltages Ed and Eq converted into two-phase voltages are inputted to the Iq calculating section 3 which calculates the q-axis current. A Hall signal is inputted from a Hall sensor which detects a rotor position of the motor 100 to the estimating section 100.

Further, the rotation number ω estimated by the estimating section 100 is inputted to advance angle control sections 110 and 120, and to the Iq calculating section 3. The advance angle control section 110 is composed of an advance angle element 111 and an adder 112, and the advance angle control section 120 is composed of an advance angle element 121 and an adder 122. An angle Δθ1 which is subject to the advance angle control by the advance angle element 111 is inputted to the adder 112, and an angle Δθ2 which is subject to the advance angle control by the advance angle element 121 is inputted to the adder 122. An angle estimated value θe estimated by the estimating section 100 is inputted to the adder 112 of the advance angle control section 110 and the adder 122 of the advance angle control section 120. An angle estimated value θ1 which is subject to the advance angle control by the advance angle control section 110 is inputted to the abc/dq converting section 8 and the dq/abc converting section 4. Further, an angle estimated value θ2 which is subject to the advance angle control by the advance angle control section 120 is inputted to a look-up table 130, and the look-up table 130 generates three-phase voltages EMFa, EMFb and EMFc, and they are inputted to the adders AD1, AD2 and AD3, respectively. The limiting sections which limit the ranges of the angles are omitted in the advance angle control sections 110 and 120.

The operation in the above constitution is explained below.

In the advance angle control of the back EMFs in the advance angle control section 120, the back EMFs EMFa, EMFb and EMFc from the look-up table 130 are used for a feed-forward control of the electric current control, and the angle θ2 which is subject to the advance angle control is used for correcting an error based on a delay of the angle estimated value θe. Further, in the advance angle control of the current command in the advance angle control section 110, the angle θ1 which is subject to the advance angle control is used for correcting a delay of the motor current Im.

The advance angle estimated value θe estimated by the estimating section 100 is estimated from motor voltages Va, Vb and Vc and motor currents Ia, Ib and Ic using a motor model (for example, Japanese Patent Application No. 2003-101195) and a Hall signal (for example, Japanese Patent Application No. 2003-101195). For this reason, a small amount of error based on measurement of voltage or electric current and a delay of a signal process (filter, reading of voltage or electric current, a Hall signal or the like) is always present in the angle estimated value θe. The delay is a function of the rotary speed of the rotor, and as the speed is higher, the delay becomes larger. That is to say, the back EMFs EMFa, EMFb and EMFc for the feed-forward control are read from the look-up table 130 based on the angle θ2, and the input into the look-up table 130 is controlled so that the delay can be easily corrected.

Figure 4:
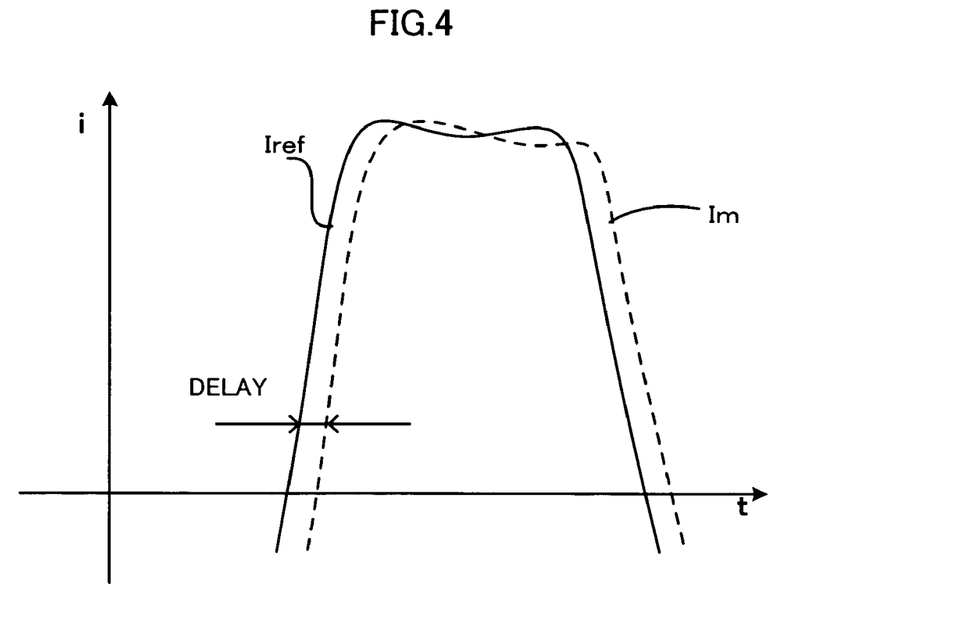
FIG. 4 is a waveform chart illustrating an example of a delay of a current response.

The delay of the motor current in the control system is caused by an inductance L of the motor 10, and this delay is a function of the speed ω. The waveform chart in FIG. 4 illustrates an example of the delay of the current response, and the current command Iref is changed from positive into negative, but the motor current Im does not track the current command Iref at a high speed. That is to say, "dim/dt" is not sufficiently fast. In the case of a one-phase motor, when the load resistance is designated by R and the motor speed is designated by ωm, the following expression (2) is established:

$$Vs = Im \cdot R + L \cdot dim/dt + EMF$$
$$= Im \cdot R + L \cdot dim/dt + Ke \cdot \omega m \quad (2)$$

When the above expression (2) is solved for "dim/dt", the following expression (3) is established:

$$dim/dt = \{Vs - Im \cdot R - Ke \cdot \omega m\}/L \quad (3)$$

However, in the function of the rotor position, "dim/dt" can be expressed as follows:

$$dim/dt = dim/d\theta \cdot d\theta/dt = dim/d\theta \cdot \omega m \quad (4)$$

According to the above expression (4), the following expression (5) is established:

$$dim/d\theta = dim/dt \cdot 1/\omega m = \{Vs - Im \cdot R - Ke \cdot \omega m\}/L \cdot 1/\omega m \quad (5)$$

The expression (5) shows the followings. That is to say, when the inductance L is large, dim/dθ is small and the delay is large. When the motor speed ωm is large, dim/dθ is small and the delay is large. In other words, the delay of the current depends on the impedance of the motor 10 and is the function of the speed ω.

The delay of the motor current Im can be reduced or cancelled previously by shifting the current command Iref by the angle Δθ1. That is to say, in the control system of the present invention, since the current commands Iaref, Ibref and Icref from the dq/abc converting section 4 are calculated by using the look-up table, the delay error can be easily corrected. In FIG. 3, the following expression (6) is established:

$$\theta 1 = \theta e + \Delta \theta 1 \quad (6)$$

The angle θ1 is used for calculating the current commands Iaref, Ibref and Icref (for example, Japanese Patent Application No. 2002-345135). The current command Iqref calculated and outputted by the Iq calculating section 3 is obtained according to the following expression (7):

$$Iqref = 2/3 \cdot Tref \cdot (\omega m/Eq) - Idref \cdot (Ed/Eq) \quad (7)$$

Further, details about conversion of two-phase "dq" into three-phase "abc" are described in, for example, Japanese Patent Application No. 2002-345135), and details about conversion of three-phase "abc" into two-phase "dq" are described in, for example, Japanese Patent Application No. 2002-345135.

Figure 5:
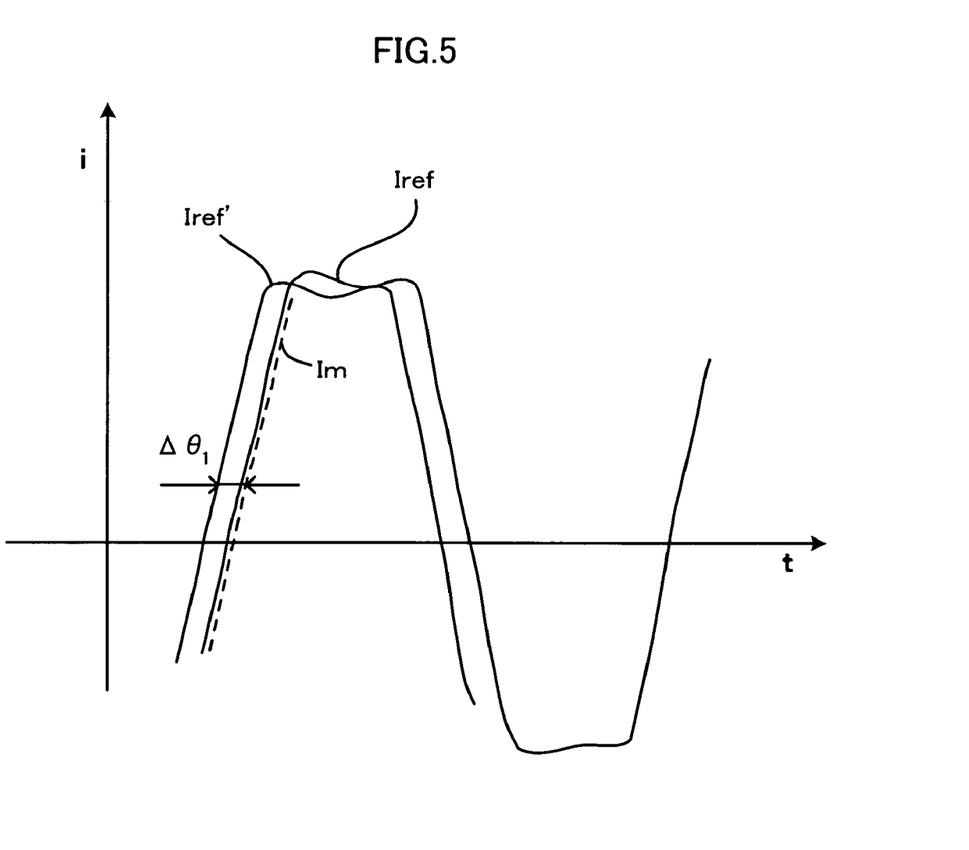
FIG. 5 is a diagram for explaining a correction of a current command.

FIG. 5 illustrates a state that the current command Iref is corrected, and the current command Iref with the same waveform shifts by the angle (time) Δθ1. The motor current Im delays from the corrected current command Iref' but does not delay from the original current command Iref.

Figure 6:
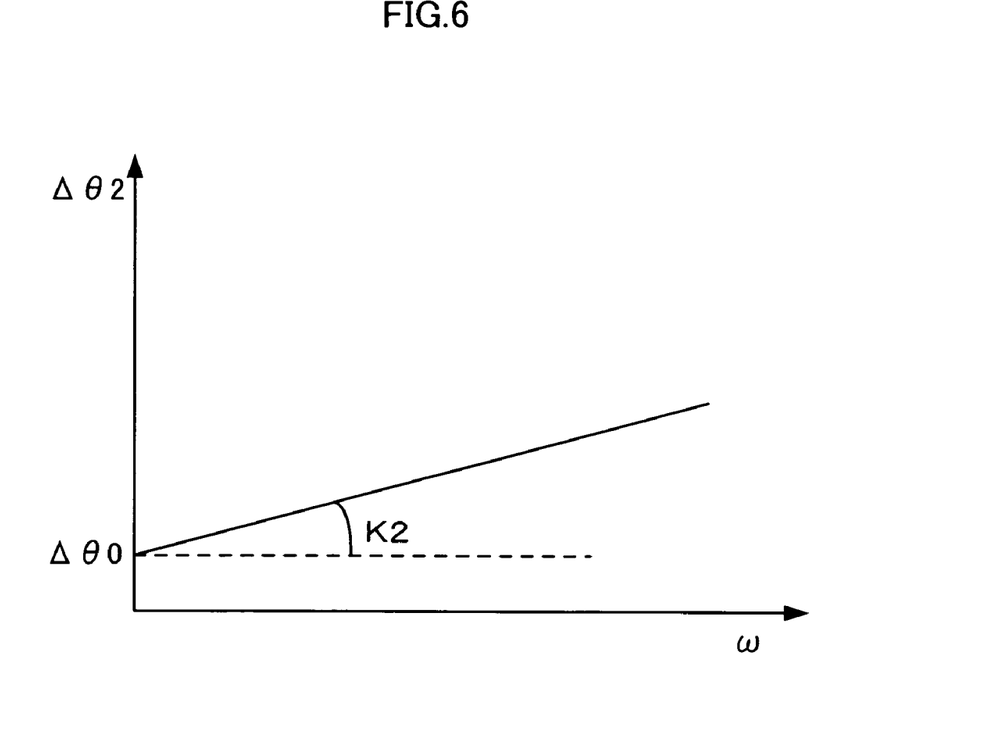
FIG. 6 is a characteristic chart illustrating an example of an advance angle.

An advance angle Δθ2 is the feature shown in FIG. 6 and is expressed by the following expression (8). "Δθ0" is offset.

$$\Delta\theta 2 = \Delta\theta 0 + K2 \cdot \omega \quad (8)$$

Figure 7:
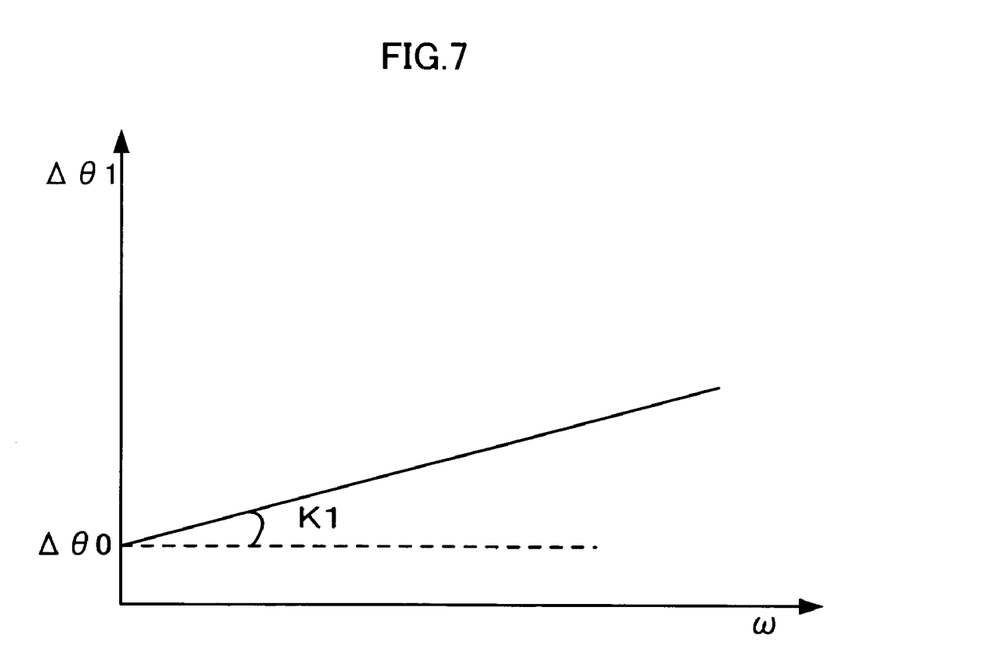
FIG. 7 is a characteristic chart illustrating an example of an advance angle.

Further, an advance angle AΘ1 is the feature shown in FIG. 7 and is expressed by the following expression (9):

$$\Delta\theta 1 = \Delta\theta 0 + K1 \cdot \omega \quad (9)$$

Since the compensation of the back EMF using the advance angle control section 120 and the look-up table 130 is based on the contents described in Japanese Patent Application No, 2003-163446 described by the applicant of the present invention, the summary is explained below.

Figure 8:
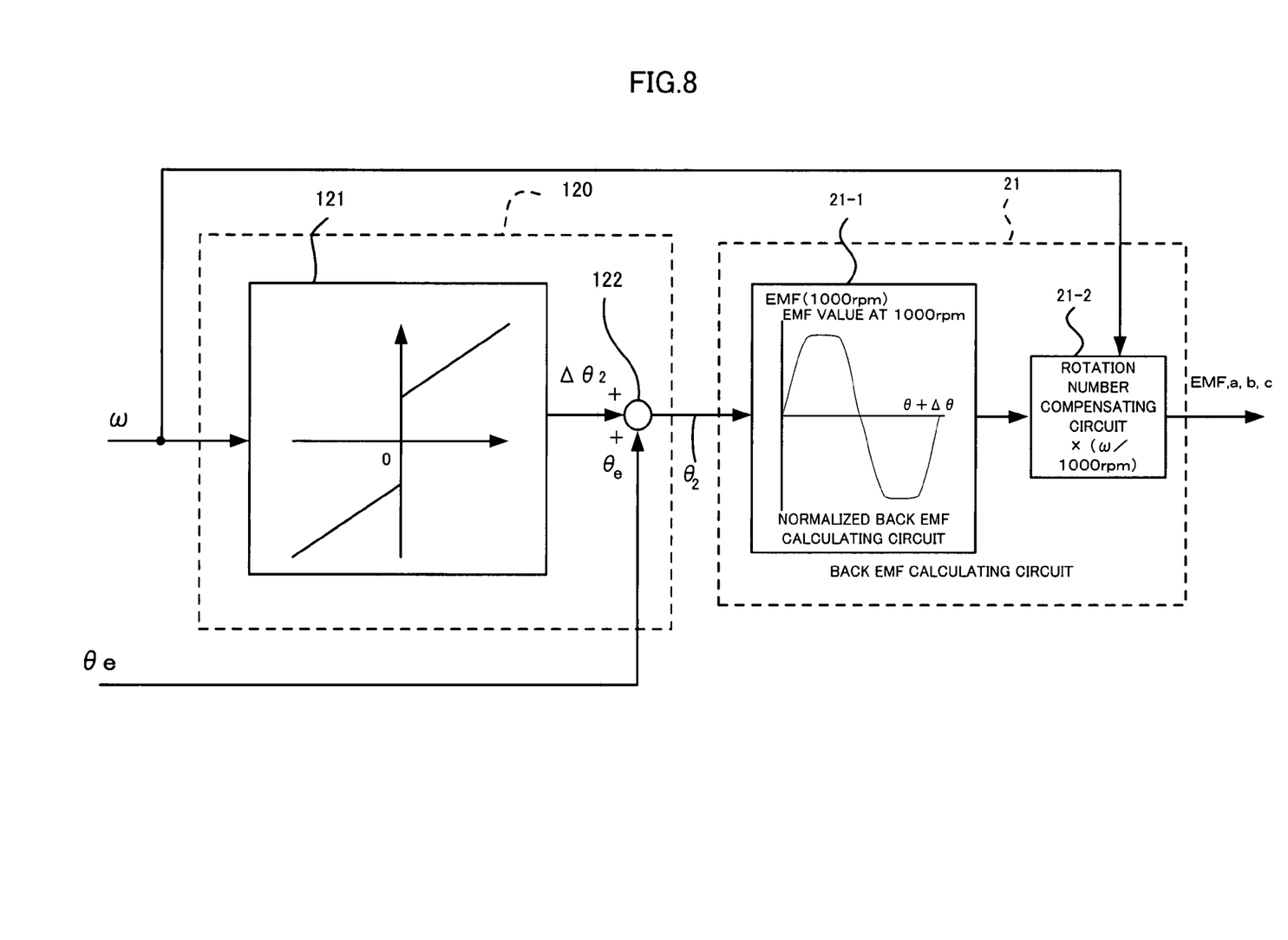
FIG. 8 is a constitutional diagram for explaining the advance angle control with respect to a back EMF.

The back EMFs (EMFa, EMFb and EMFc) are generated by a back EMF calculating circuit 21 as shown in FIG. 8, and the back EMF calculating circuit 21 is composed of a normalized back EMF calculating circuit 21-1 and a rotation number correcting circuit 21-2. The normalized back EMF calculating circuit 21-1 calculates a back EMF $EMF_{1000}$ when the motor is at 1000 [rpm] based on a corrected electric angle θ2. In the rotation number correcting circuit 21-2, since the back EMF is proportional to the rotation number and thus is expressed by the following expression (10). For example, when the motor is at 1100 [rpm], the value calculated by the normalized back EMF calculating circuit 21-1 may be made to be 1.1 times.

$$EMFa,b,c = (\omega/1000) \cdot EMF_{1000} \quad (10)$$

The normalized back EMF calculating circuit 21-1 is explained. Since the waveform of the back EMF generated by the electric angle θ varies with types and design values of actual motors, the normalized back EMF calculating circuit 21-1 obtains the back EMF $EMF_{1000}$ at 1000 [rpm] according to the actual measurement using a designed actual motor. When the corrected electric angle θ2 which does not delay is inputted from the advance angle control section 120 into the back EMF calculating circuit 21, the accurate back EMFs EMFa, EMFb and EMFc are calculated. When the normalized back EMF calculating circuit 21-1 and the rotation number correcting circuit 21-2 calculate the back EMFs EMFa, EMFb and EMFc with respect to the corrected electric angle θ2 in advance and the look-up table is formed (look-up table 130), the high-speed calculation can be made.

The meaning of the compensation of the back EMF is explained below with reference to FIGS. 9A and 9B.

Figure 9A:
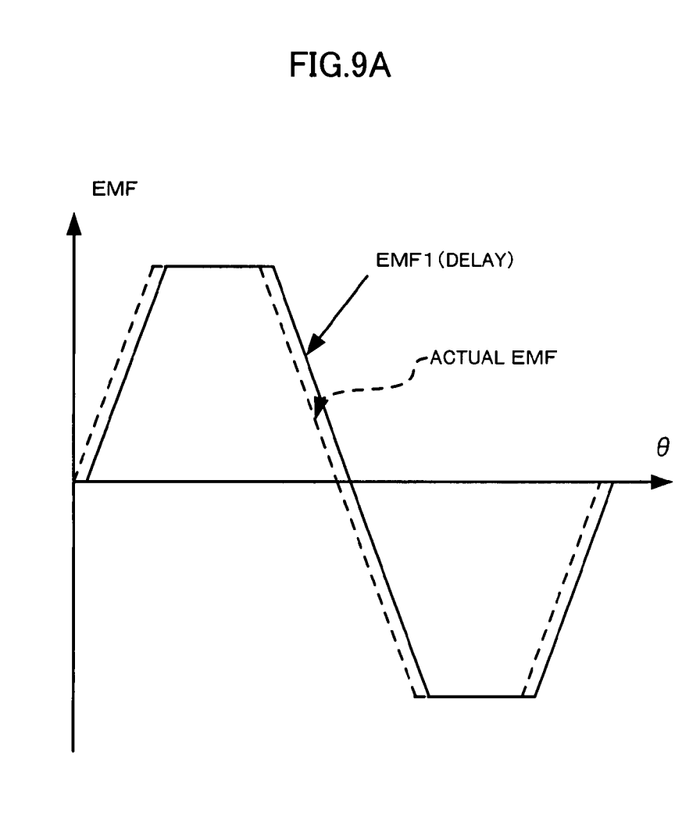
FIGS. 9A and 9B are diagrams for explaining the advance angle control with respect to the back EMF.
Figure 9B:
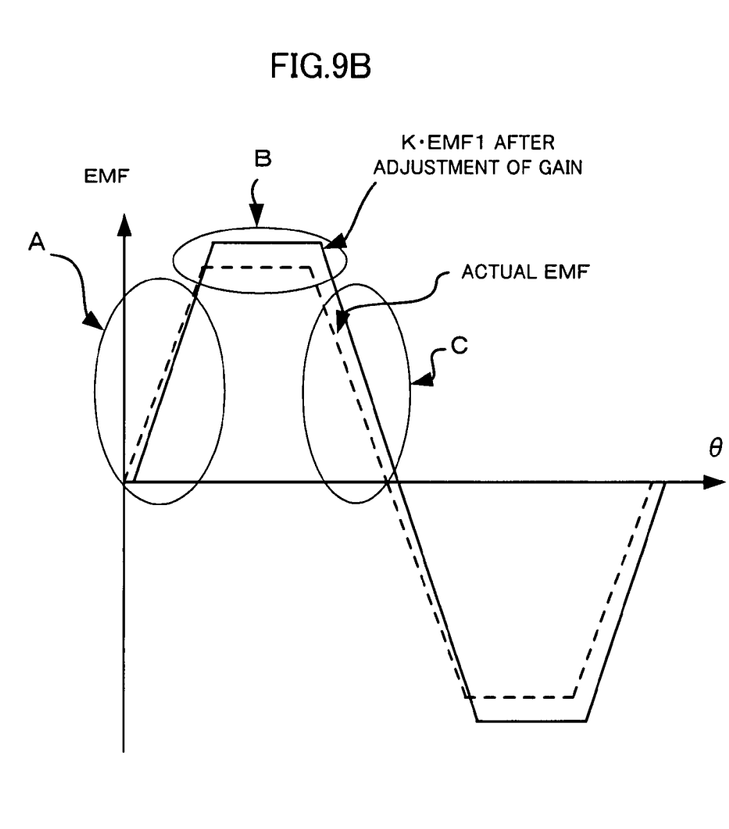

FIG. 9A illustrates a relationship between the delayed back EMF EMF1 which is calculated by the back EMF calculating circuit and the actual back EMF. FIG. 9B illustrates a relationship between the actual back EMF and the back EMF "K-EMF" which is subject to gain adjustment. In FIG. 9B, a portion where the torque ripples are difficultly reduced by an electric current control circuit or the like is surrounded by an oval A. A portion surrounded by an oval B is a portion where the delay of the back EMF can be compensated as an error and a disturbance by the electric current control circuit. Also in a portion surrounded by an oval C, similar compensation can be made by the electric current control circuit. When the back EMF is multiplied by a gain, therefore, it is important to multiply the gain and the back EMF so that the actual back EMF is superposed on the back EMF "KKMF1" multiplied by the gain in the portion surrounded by the oval A.

According to the present invention, since the advance angle obtained by the simple linear function is given to the current command, the delay of the motor current can be compensated accurately, thereby reducing the torque ripples and the operation noise of the motor. The advance angle control can be made by the simple linear function "y=a·x+b", and the compensation of the delay can improve the steering feeling.

When the compensation with respect to the back EMF is made, the steering feeling can be further improved. That is to say, the output torque ripples of the motor can be reduced, and the electric power steering apparatus whose handle operation is smooth and whose noise is less can be realized.

According to the present invention, when the delay between the information about the actual motor and the information used for the control is compensated by the advance angle control, the motor current Im can be controlled accurately. For this reason, the torque ripples and the operation noise of the motor can be reduced. The advance angle control can be made by the simple linear function, and the steering feeling can be improved by the compensation of the delay.

INDUSTRIAL APPLICABILITY

According to the present invention, since the delay between the information about the actual motor and the information used for the control is compensated by the advance angle control, the torque ripples can be reduced and device can be applied to high-performance electric power steering for automobiles and vehicles.

The invention claimed is:

1. A control device for electric power steering apparatus which adopts a vector control system for applying an assist force of a motor to a steering system, characterized in that a phase delay according to an angular velocity is obtained, a corrected electric angle is calculated by adding the phase delay to an electric angle, and generation of a current command value in the vector control is compensated based on the corrected electric angle.

2. A control device for electric power steering apparatus according to claim 1, wherein the phase delay includes a response delay of an electric current control.

3. A control device for electric power steering apparatus according to claim 1, wherein the phase delay is obtained by a linear function of an offset and a gain.

4. A control device for electric power steering apparatus according to claim 1, wherein the corrected electric angle is limited to 0° to 360°.

5. A control device for electric power steering apparatus according to claim 2, wherein the corrected electric angle is limited to 0° to 360°.

6. A control device for electric power steering apparatus which adopts a vector control system for applying an assist force of a motor to a steering system, characterized in that a first phase delay according to an angular velocity is obtained, a first corrected electric angle is calculated by adding the first phase delay to an electric angle, generation of a current command value in the vector control is compensated based on the first corrected electric angle, a second phase delay according to the angular velocity is obtained, a second corrected electric angle is calculated by adding the second phase delay to the electric angle, and a back EMF in the vector control is compensated based on the second corrected electric angle.

7. A control device for electric power steering apparatus according to claim 6, wherein the first phase delay and the second phase delay include a response delay of electric current control.

8. A control device for electric power steering apparatus according to claim 6, wherein the first phase delay and the second phase delay are obtained by a linear function of an offset and a gain.

9. A control device for electric power steering apparatus according to claim 6, wherein the first corrected electric angle and the second corrected electric angle are limited to 0° to 360°.

10. A control device for electric power steering apparatus according to claim 7, wherein the first corrected electric angle and the second corrected electric angle are limited to 0° to 360°.

* * * * *

UNITED STATES PATENT AND TRADEMARK OFFICE
CERTIFICATE OF CORRECTION

PATENT NO. : 7,443,131 B2 Page 1 of 1
APPLICATION NO. : 10/585990
DATED : October 28, 2008
INVENTOR(S) : CaoMinh Ta, Hideyuki Kobayashi and Shuji Endo It is certified that error appears in the above-identified patent and that said Letters Patent is hereby corrected as shown below:

Title page, item (22) should read as follows: PCT Filed: ~~Dec. 12, 2004~~ Dec. 21, 2004

Signed and Sealed this

Sixteenth Day of June, 2009

JOHN DOLL
*Acting Director of the United States Patent and Trademark Office*